United States Patent [19]

Huppert

[11] Patent Number: 4,624,494
[45] Date of Patent: Nov. 25, 1986

[54] TOOL FOR REMOVING ITEMS FROM A COVERED TRUCK BED

[76] Inventor: Raymond H. Huppert, Rte. 1, Box 74, Ellsworth, Wis. 54011

[21] Appl. No.: 755,694

[22] Filed: Jul. 16, 1985

[51] Int. Cl.⁴ ............................................. B25J 1/04
[52] U.S. Cl. .................................. 294/26; 294/19.1
[58] Field of Search ............ 294/2, 4, 9, 12, 15, 294/17, 18, 19.1, 19.2, 54.5, 22–24, 26, 27.1, 32, 50.6, 57, 82.1, 167, 170

[56] References Cited

U.S. PATENT DOCUMENTS

| | | | |
|---|---|---|---|
| 85,425 | 12/1868 | Brewer | 294/14 |
| 1,555,605 | 9/1925 | Pomeroy | 294/26 |
| 2,220,069 | 11/1940 | Farwig | 294/19.1 X |
| 2,275,903 | 3/1942 | Hermann | 294/19.1 |
| 2,488,312 | 11/1949 | Millican et al. | 294/26 |
| 2,604,350 | 7/1952 | Taylor | 294/26 |
| 2,639,454 | 5/1953 | Dory | 294/54.5 X |
| 3,354,520 | 11/1967 | Morgen | 294/26 X |
| 3,463,533 | 8/1969 | Repiscak et al. | 294/19.1 |
| 3,644,951 | 2/1972 | Colburn | 294/24 X |
| 3,936,088 | 2/1976 | Williams | 294/19.1 |
| 4,094,544 | 6/1978 | Spaine | 294/82.1 |
| 4,153,286 | 5/1979 | Piper et al. | 294/19.1 |

FOREIGN PATENT DOCUMENTS 167885 8/1921 United Kingdom ............... 294/18

*Primary Examiner*—Johnny D. Cherry
*Attorney, Agent, or Firm*—Merchant, Gould, Smith, Edell, Welter & Schmidt

[57] ABSTRACT

A device (5) for retrieving items from a covered truck bed (100). The device (5) has an elongated handle (10) suitable for being gripped by the human hand and a hooking element (20) extending from the second end (10b) of the handle (10). The hooking portion (20c) of the hooking element (20) is extended away from the handle by the extension portion (20a) so as to allow the user to view the hooking element (20c) when using the device (5) and the plane defined by the hooking portion (20c) is substantially perpendicular to the longitudinal axis of the handle (13).

4 Claims, 4 Drawing Figures

U.S. Patent  Nov. 25, 1986  4,624,494
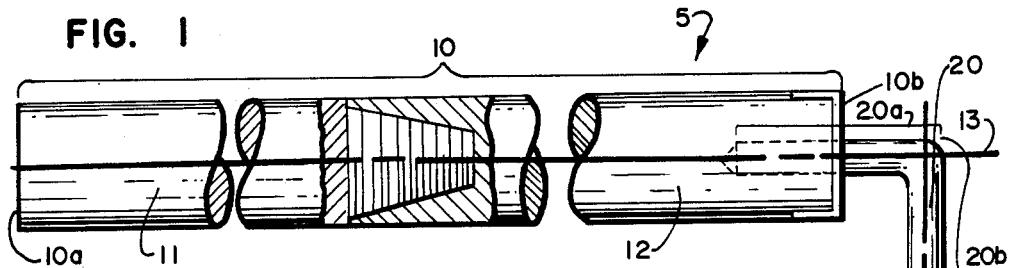
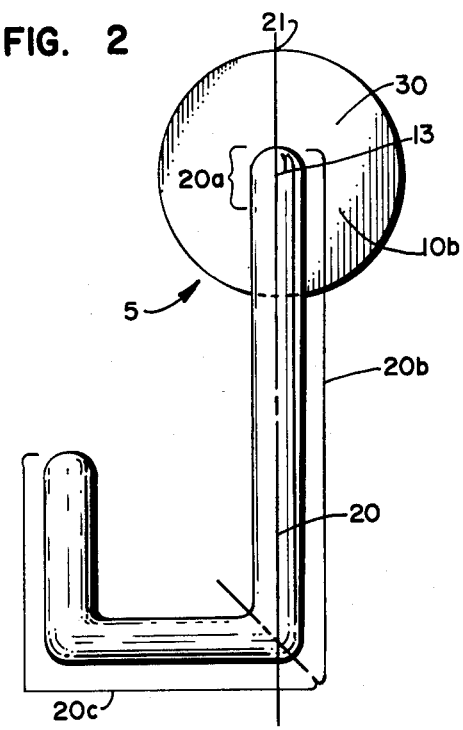
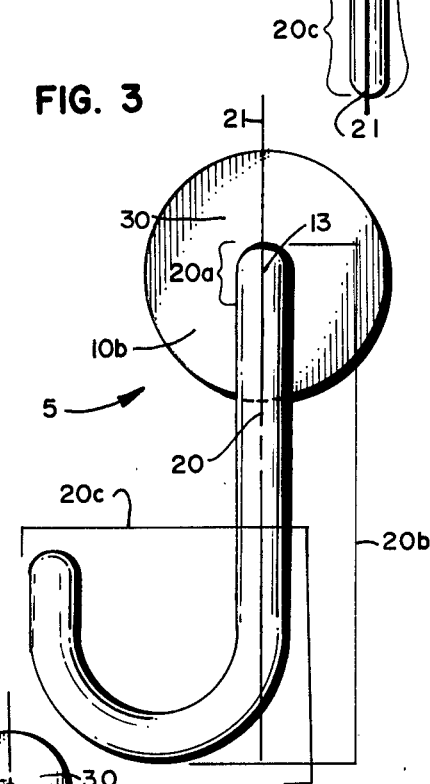
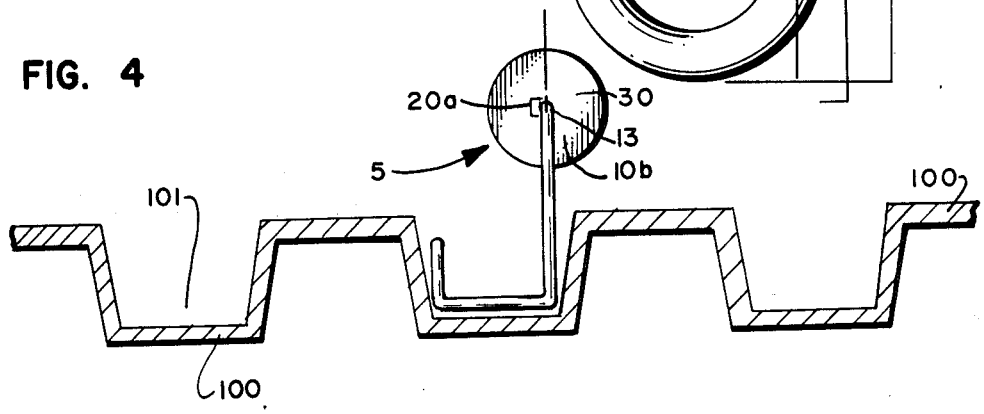

TOOL FOR REMOVING ITEMS FROM A COVERED TRUCK BED

FIELD OF THE INVENTION

This invention relates to the removal of items from a covered truck bed and deals more particularly with a tool which may be used to hook the item in the covered truck bed and drag it to within arm's reach.

BACKGROUND OF THE INVENTION

In the prior art it was necessary for an individual to crawl upon his hands and knees in order to retrieve items from the front of a covered truck bed.

The prior art discloses many arm extension devices which have differently shaped tips useful for differing applications.

Farwig, U.S. Pat. No. 2,220,069, discloses a wood handle attached to an elongated steel rod with an "L" shaped hook at the tip used for handling hot cooking utensils.

Morgan, U.S. Pat. No. 3,354,520, discloses an elongated handle with a metal hook and a fin at one end used to open and close zippers.

Repiscak et al, U.S. Pat. No. 3,463,533, discloses a handle with a longitudinally elongated U-shaped hook and longitudinally elongated L-shaped hook at one end used for the purpose of allowing a truck driver to easily adjust the right side mirror of a truck and also to close the windows and doors on the truck's right side while the driver remains seated in the driver's seat.

Colburn, U.S. Pat. No. 3,644,951, discloses an elongated handle with a 3-shaped hook which is used for unlatching and pulling the lever on the trailer truck's fifth wheel without getting the user's clothes dirty.

Williams, U.S. Pat. No. 3,936,088, discloses a flexible elongated handle which has an S-shaped hook at the tip which is connected to the handle at the center of the S wherein the upwardly open hook is used to push a tarpaulin away from the user and the downwardly open hook is used to pull the tarpaulin towards the user. Williams also discloses the use of a hinged handle which allows the tool to be folded.

Piper et al., U.S. Pat. No. 4,153,286, discloses an elongated handle having an upwardly open V-shaped hook at the tip which is used to place and remove hanging plants onto ceiling hooks.

The arm extension tools disclosed in the prior art are not adapted for removing items from a covered truck bed as the hook is not shaped so as to fit into the grooves of a truck bed, thereby allowing the user to remove small items from the grooves. Also, the hook is not extended away from the handle in such a manner as to allow the user to view the hook when the tool is used in a straight ahead fashion as is necessary to remove items from a covered truck bed. Accordingly, a substantial need exists for an arm extension tool which can remove large items from the front of a covered truck bed, remove small items located in the grooves of a truck bed and allows the user of the tool to view the hook when using the tool in a straight ahead fashion as is necessary when removing items from a covered truck bed.

SUMMARY OF THE INVENTION

The invention is an elongated handle suitable for being gripped by the human hand with a hooking element securely coupled to one end. The hooking element extends away from the handle in such a manner as to allow the user to view the hooking element when using the tool in a straight ahead manner.

The invention eliminates the need for an individual to crawl upon his hands and knees into a covered truck bed in order to remove items located at the front of the truck bed.

As used herein the terms "hook" and "hooking element" refer to a curved or bent device used to catch or drag an object.

As used herein, the term "half-handles" refers to one half of a handle which when connected to the other half of the handle forms the entire handle and "handle-sections" refers to a multiple of such handle pieces.

BRIEF DESCRIPTION OF THE DRAWINGS

FIG. 1 is a side view of a preferred embodiment of the tool.

FIG. 2 is an end view of a preferred embodiment of the tool with a square-U hooking element.

FIG. 3 is an end view of a preferred embodiment of the tool with a round-U hooking element.

FIG. 4 depicts the use of a preferred embodiment of the tool with a squared hooking element to remove items from a squared truck bed groove.

DETAILED DESCRIPTION OF THE INVENTION

As illustrated in FIG. 1 the covered truck bed hook 5 has an elongated handle 10 with a first end 10a suitable for being gripped by the human hand. A hooking element 20 is securely coupled to the second end 10b of the elongated handle 10. The hooking element 20 has (i) an attachment portion 20a which attaches hooking element 20 to handle 10, (ii) an elongated portion 20b which displaces hooking portion 20c away from the longitudinal axis 13 of the handle, and (iii) a hooking portion 20c which forms a hook which defines a plane which is substantially perpendicular to the plane passing through the longitudinal axis 13 of the handle and the longitudinal axis of the extension portion 21. Hooking element portions 20a, 20b, and 20c form a single solid hooking element.

In a preferred embodiment the second end of handle 10 is capped with a metallic cap 30 in order to prevent chipping of handle 10 and to aid in keeping hooking element 20 securely attached to handle 10. When a metallic cap 30 is utilized hooking element 20 may be welded to the metallic cap 30 as a means of ensuring that hooking element 20 is securely attached to handle 10.

In a preferred embodiment handle 10 can be taken apart into two or more handle-segments 11 and 12 of substantially equal length which, when fastened together, form handle 10. The handle segments 11 and 12 are capable of being repeatedly engaged and disengaged to aid in storage of the tool 5 when the tool 5 is not in use.

In the most preferred embodiment handle 10 is two half-handles 11 and 12 which are screwed together to form the handle 10. Attachment portion 20a of hooking element 20 is firmly embedded into the end of handle 10. Extension portion 20b of hooking element 20 is substantially perpendicular to the longitudinal axis 13 of the handle. The plane defined by hooked portion 20c of hooking element 20 is substantially perpendicular to the plane passing through the longitudinal axis 13 of the hande and the longitudinal axis of the extension portion 21 of hooking element 20. Metallic cap 30 is glued to the second end of handle 10. And, hooking element 20 is made of zinc and is welded to metallic cap 30.

OPERATION OF THE INVENTION

The invention is utilized to remove large objects from the front of a covered truck bed by either hooking a handle or some other similar projection from the item with the hooking element or placing the hooking element on the side farthest from the user and then pulling the item within arm's reach of the user.

The invention is used to remove small items which are located in the ribbed grooves 101 of the covered truck bed 100 by placing the hooking element down into the ribbed groove 101 so that the item to be removed is between the user and the hooking element and then dragging the invention along the ribbed groove 101, thereby pulling the item within arm's reach of the user.

The specification is presented above to aid in the complete non-limiting understanding of the invention. Since many variations and embodiments of the invention can be made without departing from the spirit and scope of the invention, the invention resides in the claims hereinafter appended.

I claim:

1. A tool for retrieving items from a covered truck bed having rounded grooves comprising:
   (a) a cylindrical elongated handle about 5 feet to 6 feet long and about 1 inch to 1.5 inches in diameter; the handle having a longitudinal axis, a first end and a second end; the handle comprising two handle-sections of substantially equal length which are screwed together and may be repeatedly engaged and disengaged;
   (b) a metal rod extending from the second end of the handle, the metal rod comprising:
      (i) an attachment portion embedded into the handle;
      (ii) an extension portion having a longitudinal axis, the extension portion integrally coupled with the attachment portion and extending substantially perpendicular to the longitudinal axis of the handle; and
      (iii) a hooked portion integrally coupled with the extension portion, the hooked portion forming a rounded hook which defines a plane substantially perpendicular to a plane passing through the longitudinal axis of the handle and the longitudinal axis of the extension portion, the rounded hook substantially conforming in size and shape to a cross-sectional portion of a rounded truck bed groove whereby the hooked portion can rest snuggly within the truck bed grooves; and
   (c) a metallic cap over the second end of the handle, the metallic cap securely coupled with the handle and welded to the metal rod.

2. A tool as recited in claim 1 wherein the metal rod comprises zinc.

3. A tool for retrieving items from a covered truck bed having squared grooves comprising:
   (a) a cylindrical elongated handle about 5 feet to 6 feet long and about 1 inch to 1.5 inches in diameter, the handle having a longitudinal axis, a first end and a second end, the handle comprising two handle-sections of substantially equal length which are screwed together and may be repeatedly engaged and disengaged;
   (b) a metal rod extending from the second end of the handle, the metal rod comprising:
      (i) an attachment portion embedded into the handle;
      (ii) an extension portion having a longitudinal axis, the extension portion integrally coupled with the attachment portion and extending substantially perpendicular to the longitudinal axis of the handle; and
      (iii) a hooked portion integrally coupled with the extension portion, the hooked portion forming a squared hook which defines a plane substantially perpendicular to a plane passing through the longitudinal axis of the handle and the longitudinal axis of the extension portion, the squared hook substantially conforming in size and shape to a cross-sectional portion of a squared truck bed groove whereby the hooked portion can rest snuggly within the truck bed grooves; and
   (c) a metallic cap over the second end of the handle, the metallic cap securely coupled with the handle and welded to the metal rod.

4. A tool as recited in claim 3 wherein the metal rod comprises zinc.

* * * * *

UNITED STATES PATENT AND TRADEMARK OFFICE
CERTIFICATE OF CORRECTION

PATENT NO. : 4,624,494
DATED : November 25, 1986
INVENTOR(S) : RAYMOND H. HUPPERT It is certified that error appears in the above-identified patent and that said Letters Patent is hereby corrected as shown below:

In column 2, line 68, for "hande" read --handle--.

Signed and Sealed this

Seventh Day of April, 1987

Attest:

DONALD J. QUIGG

Attesting Officer

Commissioner of Patents and Trademarks